(12) United States Patent
Poveda Carias et al.

(10) Patent No.: US 12,448,043 B2
(45) Date of Patent: Oct. 21, 2025

(54) METHOD FOR DETERMINING THE ANGULAR POSITION OF A COMPLEX VEHICLE WITH TWO AXES OF ROTATION, AND SYSTEM CONFIGURED TO IMPLEMENT SUCH A METHOD

(71) Applicant: CONTINENTAL AUTONOMOUS MOBILITY GERMANY GMBH, Ingolstadt (DE)

(72) Inventors: Vicente Poveda Carias, Toulouse (FR); David Guerrero, Toulouse (FR); Jean-Baptiste Vimort, St Genis les Ollières (FR)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 0 days.

(21) Appl. No.: 18/699,383

(22) PCT Filed: Sep. 26, 2022

(86) PCT No.: PCT/EP2022/076699
§ 371 (c)(1),
(2) Date: Apr. 8, 2024

(87) PCT Pub. No.: WO2023/066610
PCT Pub. Date: Apr. 27, 2023

(65) Prior Publication Data
US 2024/0326909 A1 Oct. 3, 2024

(30) Foreign Application Priority Data
Oct. 22, 2021 (FR) ........................ 2111234

(51) Int. Cl.
B62D 13/06 (2006.01)
B62D 15/02 (2006.01)
G01B 11/26 (2006.01)

(52) U.S. Cl.
CPC .......... *B62D 13/06* (2013.01); *B62D 15/021* (2013.01); *G01B 11/26* (2013.01)

(58) Field of Classification Search
CPC ...... B62D 13/06; B62D 15/021; G01B 11/26; B60D 1/62
See application file for complete search history.

(56) References Cited

U.S. PATENT DOCUMENTS

2018/0039278 A1* 2/2018 Hüger ................. G05D 1/0223
2020/0247471 A1* 8/2020 Grodde ............... B60W 50/045

FOREIGN PATENT DOCUMENTS

FR 3106560 A1 7/2021
WO 2019202317 A1 10/2019

OTHER PUBLICATIONS

International Preliminary Report on Patentability issued on May 9, 2022 by République Française, INPI, France, in corresponding Application No. FR2111234. 10 Pages.
(Continued)

*Primary Examiner* — Xiao En Mo
(74) *Attorney, Agent, or Firm* — Buchanan Ingersoll & Rooney PC

(57) ABSTRACT

A method for determining the angular position of a vehicle including a towing vehicle, a towing platform articulated on the towing vehicle, and a trailer articulated on the towing platform. The method includes camera acquiring a first image in a first reference position of the vehicle, and detecting at least one characteristic point of the trailer in the first position. The camera acquires a second image in a second position of the vehicle, and detects the characteristic point in the second position, the detected characteristic point (Continued)

being the same for each position. A position of the characteristic point is estimated in the first position and the second position of the vehicle by minimizing a cost function based on an iteration of different values of the height of the characteristic point in the first position of the vehicle and of the characteristic point in the second position of the vehicle. The angle of rotation between the trailer and the towing platform is determined based on the estimated position of the characteristic point estimated during the estimation step.

5 Claims, 7 Drawing Sheets

(56) References Cited

OTHER PUBLICATIONS

International Search Report (PCT/ISA/210) with translation and Written Opinion (PCT/ISA/237) mailed on Jan. 19, 2023, by the European Patent Office as the International Searching Authority for International Application No. PCT/EP2022/076699. 14 Pages.

* cited by examiner

METHOD FOR DETERMINING THE ANGULAR POSITION OF A COMPLEX VEHICLE WITH TWO AXES OF ROTATION, AND SYSTEM CONFIGURED TO IMPLEMENT SUCH A METHOD

CROSS REFERENCE TO RELATED APPLICATIONS

This application is the U.S. National Phase Application of PCT International Application No. PCT/EP2022/076699, filed Sep. 26, 2022, which claims priority to French Application No. 2111234, filed Oct. 22, 2021, the contents of such applications being incorporated by reference herein.

FIELD OF THE INVENTION

The present patent application relates to a method for determining the angular position of a vehicle comprising a towing vehicle, a towing platform articulated on the towing vehicle at a first anchoring point, at least about a first axis of rotation generally perpendicular to the general plane of the towing platform, and a trailer articulated on the towing platform at a second anchoring point, at least about a second axis of rotation generally perpendicular to the general plane of the towing platform, at a second anchoring point.

The method is implemented by a system that comprises a computer and a camera oriented toward the rear of the towing vehicle.

BACKGROUND OF THE INVENTION

A number of technologies are currently being developed to assist drivers in driving vehicles, for example, by providing them with additional information concerning the configuration of the vehicle and its position relative to its environment. These technologies are also required in the context of fully autonomous vehicles. This is the case for personal vehicles, but also for transport vehicles, typically comprising a towing vehicle and a trailer.

In order to assist with driving such vehicles, and notably for maneuvers aimed at parking the vehicle, it is critical that at least the yaw angle of the trailer relative to the towing vehicle is precisely known.

Some configurations of trailer vehicles are particularly complex, this is the case for vehicles with two couplings, or two articulations, and that are made up of a towing vehicle, a towing platform articulated on the towing vehicle, at a first anchoring point, and a trailer articulated on the platform, at a second anchoring point.

Notably, a type of double-articulated vehicle is known in which the towing vehicle is a rigid heavy goods vehicle.

The towing platform is sometimes referred to as a "dolly" and a trailer or a semi-trailer is then attached to this platform.

An ongoing problem that is encountered with this type of double-articulated vehicle, in other words with double-couplings, is the difficulty in maneuvering due to the dual rotation between the towing vehicle and the trailer.

Therefore, assisting the driver would be of interest by providing them with a control that relies on the actual angle of the semi-trailer instead of using the steering wheel, which allows better control of the trajectory of the entire vehicle during a parking maneuver.

SUMMARY OF THE INVENTION

Notably, an aspect of the present invention is a means for determining the position of a double-articulated vehicle.

In particular, an aspect of the invention is to determine at least the angle formed by a trailer relative to a towing platform, which itself is articulated relative to the towing vehicle.

This aim is achieved, as well as others that will become apparent upon reading the following description, with a method for determining the angular position of a vehicle comprising a towing vehicle, a towing platform articulated on the towing vehicle at a first anchoring point, at least about a first axis of rotation generally perpendicular to the general plane of the towing platform, and a trailer articulated on the towing platform at a second anchoring point, at least about a second axis of rotation generally perpendicular to the general plane of the towing platform, at a second anchoring point, which method is implemented by a system comprising a computer and a camera oriented toward the trailer, characterized in that it comprises the following steps of:

the camera acquiring a first image in a first reference position of the vehicle, and of detecting at least one characteristic point of the trailer in said first position, which point is observed in the first image;

the camera acquiring a second image in a second position of the vehicle, and of detecting said characteristic point in the second position, which point is observed in the second image, the detected characteristic point being the same for each position;

estimating the position of the characteristic point in the first position and the second position of the vehicle, which point is observed in the first image and in the second image, respectively, by minimizing a cost function based on an iteration of different values of the height of the characteristic point in the first position of the vehicle and of the characteristic point in the second position of the vehicle, along an axis perpendicular to the general plane of the towing platform; and determining the angle of rotation between the trailer and the towing platform based on the estimated position of the characteristic point in the first position and the second position that is estimated during the previous estimation step. The method according to an aspect of the invention offers the advantage of being able to adapt to various types of vehicle, in particular various types of trailers that have distinct geometries, such as a skip, a wood log trailer or a tank type trailer.

According to other optional features of the method according to an aspect of the invention, taken individually or in combination:

the cost function used in the step of estimating the position of the characteristic point is as follows:

$$coût = |\,\|P_{RLA} - M_A\| - \|P_{RLB} - M_B\|\,|$$

with:
$P_{RLA}$ being the point that indicates the intersection between an imaginary plane that is parallel to the general plane of the towing platform and is of variable height, and an optical ray of the camera that passes through the characteristic point of the first position;

$M_A$ being the second anchoring point in the first position;

$P_{RLB}$ being the point that indicates the intersection between said imaginary plane that is parallel to the general plane of the towing platform and is of variable height, and an optical ray of the camera that passes through the characteristic point of the second position; and $M_B$ being the second anchoring point in the second position;

the step of geometrically determining the angle of rotation between the trailer and the towing platform is obtained by the following computation:

$$\alpha 2 = 2 * \sin^{-1}\left(\frac{|F_{R\hat{y}B} - F_{R\hat{y}A}|/2}{|F_{R\hat{y}A} - M|}\right)$$

with:

$F_{r\hat{y}B}$ being the estimated characteristic point in the second position;

$F_{r\hat{y}A}$ being the estimated characteristic point in the first position; and M being the second anchoring point. It will be noted that the method is based on simple computations that promote rapid execution by a computer.

An aspect of the present invention also relates to a system for determining the angular position of a vehicle comprising a towing vehicle, a towing platform articulated on the towing vehicle at a first anchoring point, at least about a first axis of rotation generally perpendicular to the general plane of the towing platform, and a trailer articulated on the towing platform at a second anchoring point, at least about a second axis of rotation generally perpendicular to the general plane of the towing platform, at a second anchoring point, said system comprising a computer and a camera oriented toward the trailer, characterized in that it is configured to implement the method as described above.

Thus, an aspect of the present invention relates to a computer program product, comprising code instructions for implementing the method described above.

BRIEF DESCRIPTION OF THE DRAWINGS

Further features and advantages of aspects of the invention will become apparent upon reading the following description, with reference to the appended figures, which illustrate.

For greater clarity, identical or similar elements are denoted by identical or similar reference signs throughout the figures.

DETAILED DESCRIPTION OF THE PREFERRED EMBODIMENTS

In order to clarify the parts of the present patent application, the terms horizontal and vertical will be adopted in a non-limiting manner with reference to the ground over which the vehicle is moving, with the ground being considered to be horizontal.

In addition, the terms longitudinal, vertical and transverse will be adopted in a non-limiting manner with reference to the L, V, T trihedron indicated in FIGS. 1 to 5.

Figure 1:
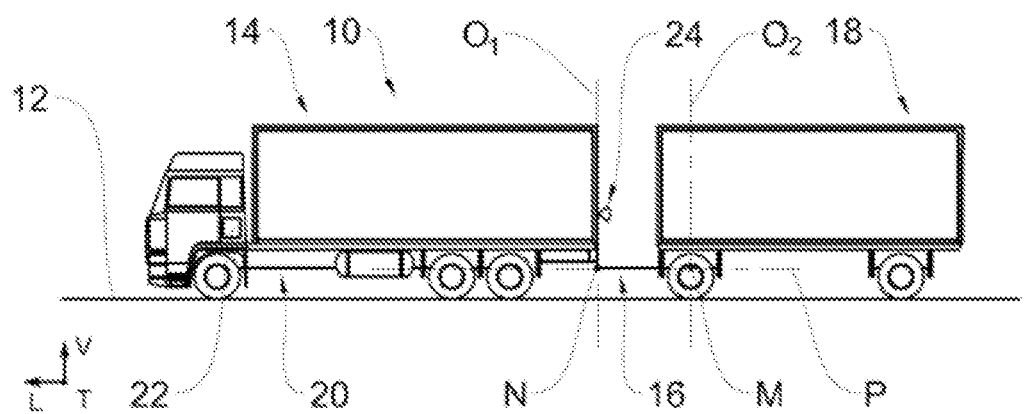
FIG. 1 is a schematic side view of a double-articulated vehicle successively comprising a towing vehicle, a towing platform and a trailer, with the method according to an aspect of the invention being applied to said vehicle.

FIG. 1 shows a motor vehicle 10 in an operating configuration over horizontal ground 12.

The vehicle 10 comprises a towing vehicle 14, a towing platform 16 articulated by a ball-joint connection on the towing vehicle 14 at a first anchoring point N.

The ball-joint connection between the towing platform 16 and the towing vehicle 14 allows three degrees of rotational freedom, and in particular one degree of rotation about a first axis of vertical rotation O1 and perpendicular to the ground 12.

In addition, a trailer 18 is mounted in an articulated manner by a ball-joint connection on the towing platform 16 at a second anchoring point M.

The ball-joint connection between the trailer 18 and the towing platform 16 allows three degrees of rotational freedom, and in particular one degree of rotation about a second axis of vertical rotation O2 and perpendicular to the general plane of the towing platform.

FIG. 1 also shows a system 20 that comprises a computer 22 and a camera 24. The camera 24 is mounted on the towing vehicle 14 and is adapted to acquire images of the trailer 18.

To this end, the camera 24 is advantageously positioned at the rear of the towing vehicle 14, being directed toward the trailer 18, with a longitudinal optical axis O3 substantially parallel to the axis O4 of the towing vehicle 14.

As an alternative embodiment, the camera 24 can have another orientation, and the camera 24 then needs to be calibrated in order to know this orientation and to take it into account for determining the angles of the vehicle 10.

The computer 22 is associated with a memory (not shown) comprising a computer program for executing the method according to an aspect of the invention described hereafter. The computer 22 can be a processor, a microprocessor, a controller, a microcontroller or the like.

Figure 2:
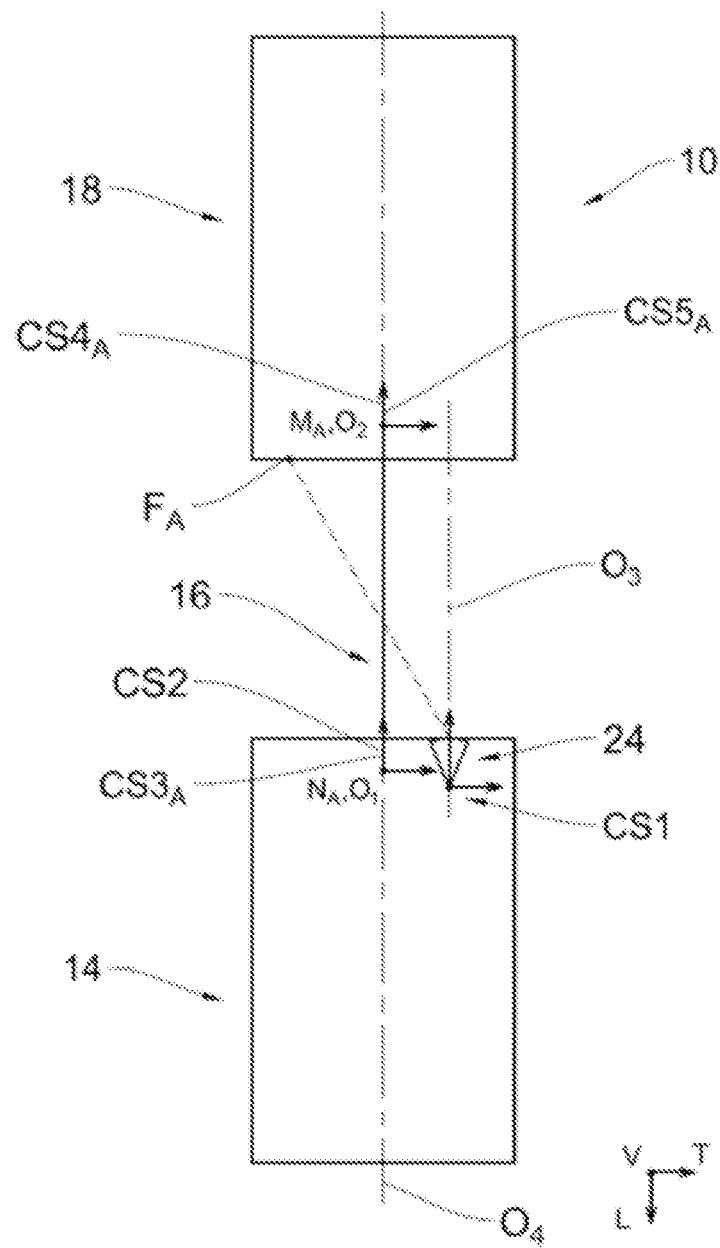
FIG. 2 is a schematic top view of the vehicle of FIG. 1 in a first reference position.

FIG. 2 schematically shows the vehicle 10 in a first reference position that corresponds to a straight movement of the vehicle 10, in which position the angle of rotation between the towing vehicle 14 and the towing platform 16 is zero.

Similarly, the angle of rotation between the towing platform 16 and the trailer 18 is zero.

Figure 3:
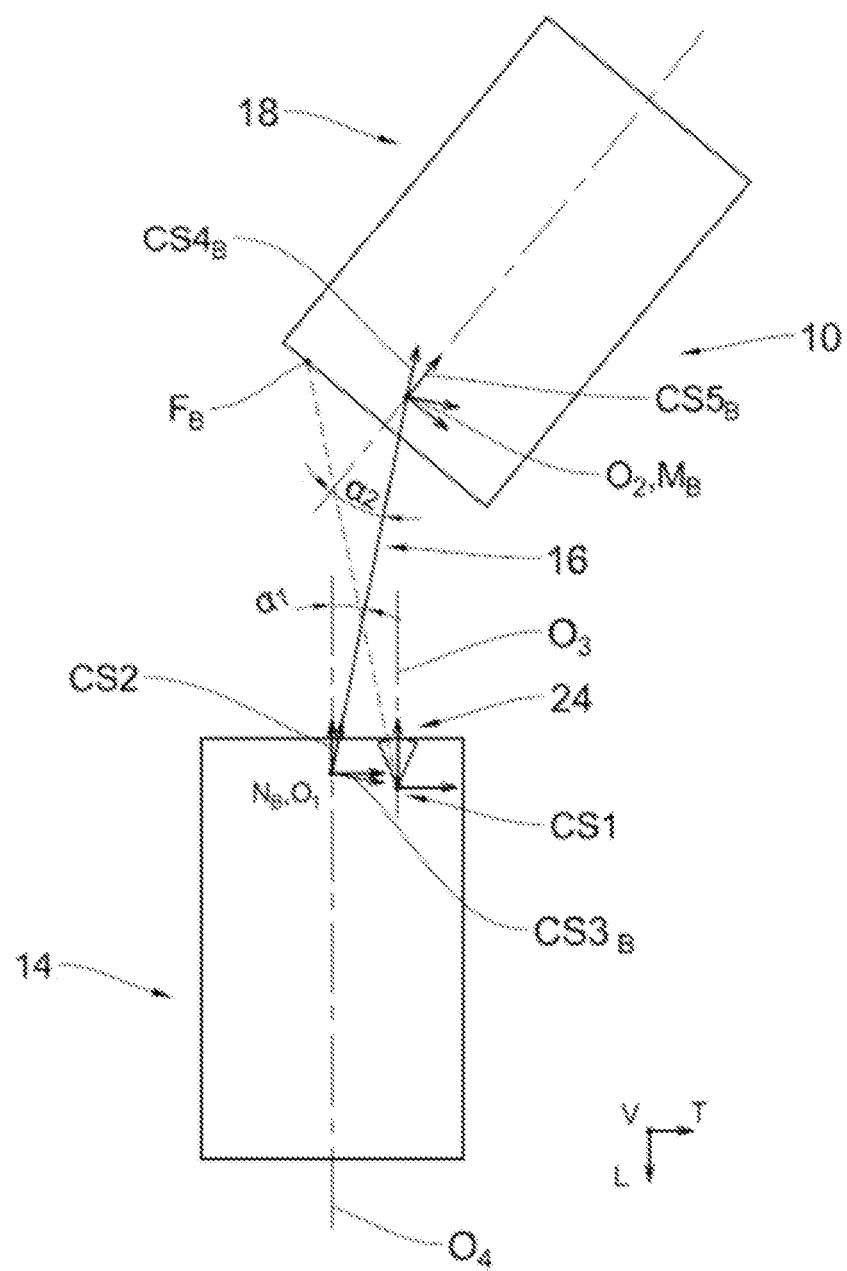
FIG. 3 is a schematic top view of the vehicle of FIG. 1 in a second position in which the towing platform delimits a non-zero angle with the towing vehicle and with the trailer.

FIG. 3 schematically shows the vehicle 10 in a second position that corresponds to a non-straight movement of the vehicle 10, in which position the angle of rotation $\alpha 1$ between the towing vehicle 14 and the towing platform 16 is non-zero.

Similarly, the angle of rotation $\alpha 2$ between the towing platform 16 and the trailer 18 is non-zero.

In order to better understand the description, the references indexed by the capital letter A and the capital letter B refer to the first position and to the second position of the vehicle 10, respectively.

Notably, it will be noted that the first anchoring point N and the second anchoring point M shown in FIG. 1 are denoted $N_A$, $N_B$ and $M_A$, $M_B$ with reference to the first position and to the second position of the vehicle 10, respectively. This notation applies to the other references, mutatis mutandis.

FIGS. 2 and 3 show different coordinate systems. The coordinate system CS1 has the towing vehicle 14 as a reference and the optical center of the camera 24 as the center.

The coordinate system CS2 has the towing vehicle 14 as a reference and the first axis of rotation O1 at the first anchoring point N as the center, the coordinate system CS2 is aligned with the towing vehicle 14.

The coordinate system CS3 has the towing platform 16 as a reference and the first axis of rotation O1 at the first anchoring point N as the center, the coordinate system CS3 is aligned with the towing platform 16.

The coordinate system CS4 has the towing platform 16 as a reference and the second axis of rotation O2 at the second anchoring point M as the center, the coordinate system CS4 is aligned with the towing platform 16.

Finally, the coordinate system CS5 has the trailer 18 as a reference and the second axis of rotation O2 at the second anchoring point M as the center, the coordinate system CS5 is aligned with the trailer 18.

The relationship between the coordinate systems CS1 and CS2 is a single translation movement from the optical center of the camera 24 to the first anchoring point N, and a rotation if the camera 24 is not aligned in the axis of the towing vehicle 14.

The relationship between the coordinate systems CS2 and CS3 is a rotation with three degrees of freedom about the first anchoring point N.

The relationship between the coordinate systems CS3 and CS4 is a translation movement from the first anchoring point N to the second anchoring point M.

Finally, the relationship between the coordinate systems CS4 and CS5 is a rotation with three degrees of freedom about the second anchoring point M, which rotation is simplified to one degree of freedom about the second axis O2 assuming that the ground 12 is flat.

Furthermore, the coordinate systems CS3, CS4, CS5 are indexed with the capital letter A and the capital letter B, with reference to the first position and to the second position of the vehicle 10, respectively. For example, CS3B designates the coordinate system CS3 in the second position of the vehicle 10, as in FIG. 3. The coordinate systems CS1 and CS2 are not covered by the indices A and B because they are immobile in the reference frame of the vehicle 10.

H1-2 denotes a homogeneous transformation matrix from the coordinate system CS1 to the coordinate system CS2, with this homogeneous transformation matrix H1-2 being known.

This type of notation applies to the other homogeneous transformation matrices, mutatis mutandis.

The matrix H1-2 is a concatenation of a rotation and translation matrix such that:

$$P1 = H1\text{-}2 * P2$$

where P1 are the coordinates of a point P in the coordinate system CS1:

$$P1 = \begin{pmatrix} x1 \\ y1 \\ z1 \\ 1 \end{pmatrix}$$

and P2 are the coordinates of the point P in the coordinate system CS2:

$$P2 = \begin{pmatrix} x2 \\ y2 \\ z2 \\ 1 \end{pmatrix}$$

The following is noted:

$$H1 \rightarrow 2 = \begin{bmatrix} Raa12 & Rab12 & Rac12 & Tx12 \\ Rba12 & Rbb12 & Rbc12 & Ty12 \\ Rca12 & Rcb12 & Rcc12 & Tz12 \\ 0 & 0 & 0 & 1 \end{bmatrix}$$

where Rij12 are the terms of rotation between the coordinate systems CS1 and CS2 and Ti12 are the terms of translation between the coordinate systems CS1 and CS2.

All the previous notations apply to the other coordinate systems, mutatis mutandis.

Furthermore, it will be noted that the transformations H2-3$_A$, H3$_A$-4$_A$ and H4$_A$-5$_A$ are known.

For any other position, and in particular for the second position of the vehicle 10, the transformations H2-3$_B$ and H3$_B$-4$_B$ are known; however, the transformation H4$_B$-5$_B$ that corresponds to the rotation between the trailer 18 and the towing platform 16 must be identified.

It also will be noted that $M_A$ designates the position of the second anchoring point in the first position of the vehicle 10 and that $M_B$ designates the position of the second anchoring point in the second position of the vehicle 10.

Figure 6:
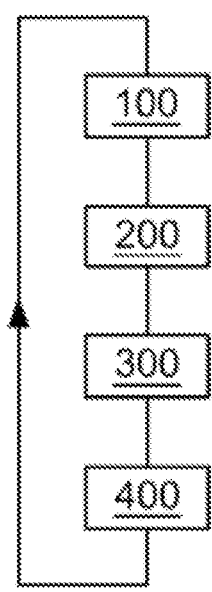
FIG. 6 is a flowchart of the sequence of the steps of the method according to an aspect of the invention.

FIG. 6 shows the steps of the method for determining the angular position of the vehicle 10, which method is implemented by the system 20 described above, according to an aspect of the invention.

More specifically, the method according to an aspect of the invention aims to determine the angle of rotation α2 between the trailer 18 and the towing platform 16, based on the correspondence of characteristic points between different associated positions and images, and an estimate of the angle of rotation α1 between the towing vehicle 14 and the towing platform 16. Methods for estimating the angle of rotation between two pivotably mounted elements are known to a person skilled in the art and therefore will not be described in the present description.

Notably, a method is known that involves using a mechatronic sensor to determine the angle of rotation α1 between the towing vehicle 14 and the towing platform 16.

The method comprises a first step 100 of the camera 24 acquiring a first image, in the first reference position of the vehicle 10, illustrated in FIG. 2. Preferably, in the first reference position, the angles α1 and α2 are zero. In this respect, the vehicle 10 has preferably travelled over a straight line over a sufficient distance to be able to adopt this reference position.

In addition, the first acquisition step 100 comprises detecting a set of characteristic points in the first position, based on the associated first image. Advantageously, the set of characteristic points comprises salient points of the trailer 18.

Detecting the set of characteristic points comprises a segmentation phase, which is known to a person skilled in the art and which aims to separate the characteristic points belonging to the object of interest, in this case the trailer 18, from those that are not of interest, such as the background or the towing platform 16, for example.

For the sake of clarity, the embodiment of the method according to the invention described hereafter takes into account a single characteristic point $F_A$ shown in FIG. 2.

Following the first acquisition step 100, the method comprises a second step 200 of the camera 24 acquiring a second image, in the second position of the vehicle 10, illustrated in FIG. 3, after the vehicle 10 has moved.

Furthermore, the second acquisition step 200 comprises detecting at least some of the characteristic points detected in the first reference position of the vehicle 10. For the sake of clarity, only the characteristic point $F_B$ of the second position observed in the second image, which corresponds to the characteristic point $F_A$ detected in the first position observed in the first image, is taken into account in the present embodiment of the invention.

This detection can be implemented by tracking the position of the characteristic points between the first and the second position, according to methods that are known to a person skilled in the art.

Optionally, several images can be acquired during the second acquisition step 200 in order to increase the accuracy of the determined values of the parameters.

Since the trailer 18 is a rigid object that is connected to the second anchoring point M, the distance between any characteristic point and the second anchoring point M is constant in any position of the vehicle 10.

Consequently, it is possible to establish the following equation:

$$\|M_A - F_A\| = \|M_B - F_B\|$$

Following the second acquisition step 200, the method comprises a step 300 of estimating the position of the characteristic point $F_A$, $F_B$ in the first position and the second position of the vehicle 10, with reference to the first image and to the second image, respectively, by minimizing a cost function based on an iteration of different values of the height y of the characteristic point $F_A$ in the first position of the vehicle 10 and of the characteristic point $F_B$ in the second position of the vehicle 10.

The term "height y" is understood to mean a distance that extends along an axis perpendicular to the general plane P of the towing platform 16, from the center of the relevant coordinate system.

By way of a reminder, the characteristic points $F_A$ and $F_B$ correspond to the same point F of the trailer 18 when the vehicle 10 assumes its first position and its second position, respectively.

It is assumed that all the rotations in $H4_B$-$5_B$ are carried out about the vertical axis of the coordinate system CS4B, based on the principle that the roll and pitch movements between the towing platform 16 and the trailer 18 of the vehicle 10 are negligible.

This assumption implies that the height of the characteristic point $F_A$ in $CS4_A$ and in $CS5_A$, and the height of the characteristic point $F_B$ in $CS4_B$ and $CS5_B$ are equal.

Figure 4:
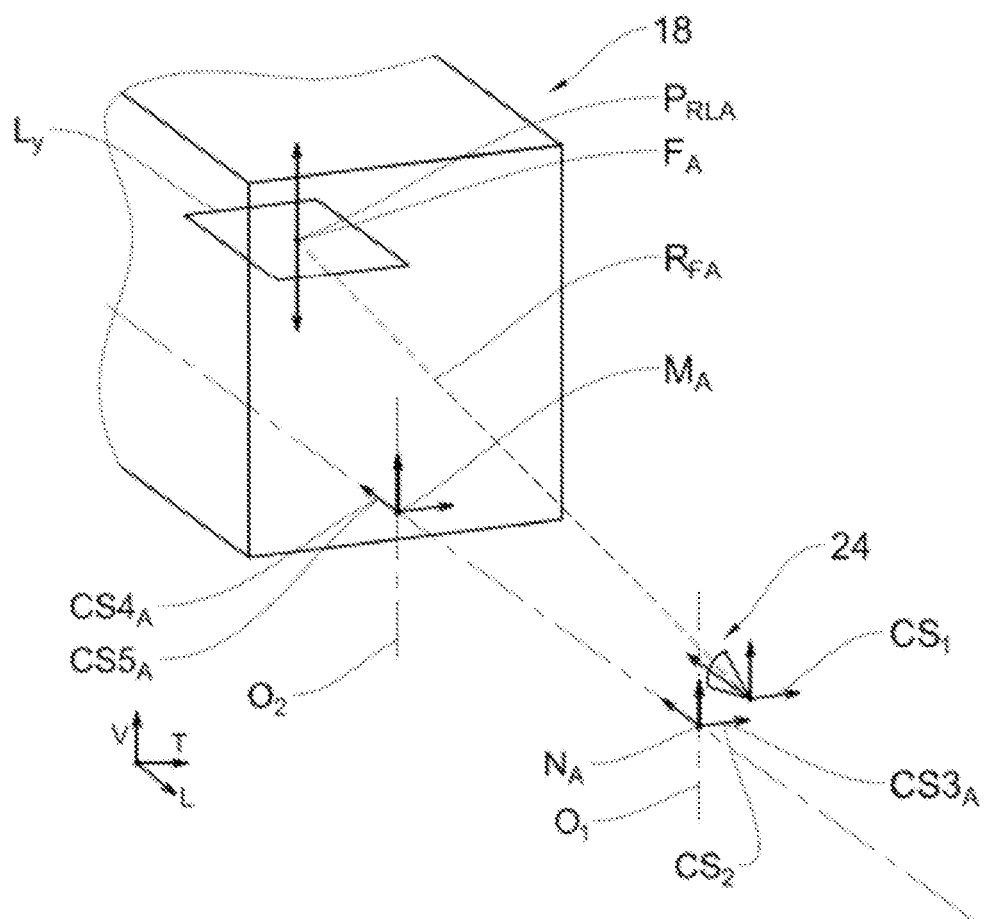
FIG. 4 is a schematic perspective view of the vehicle of FIG. 1 in its first reference position.
Figure 5:
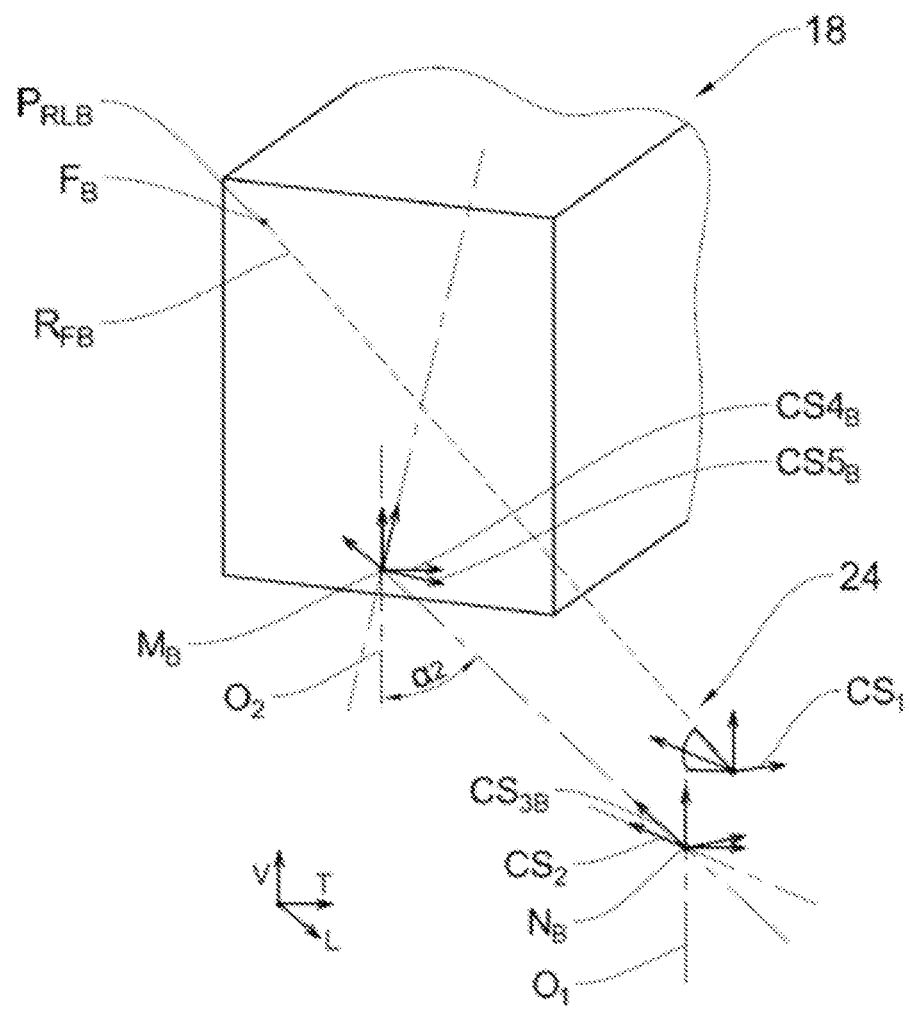
FIG. 5 is a schematic perspective view of the vehicle of FIG. 1 in its second position.

A horizontal imaginary plane Ly is defined at a height y, which is parallel to the general plane of the towing platform 16, as can be seen in FIG. 4.

Furthermore, the point $P_{RLA}$ is defined as being the point of intersection between the imaginary plane Ly of variable height y, and an optical ray $R_{FA}$ leaving the camera 24 that passes through the characteristic point $F_A$ observed in the first image. The optical ray $R_{FA}$ passes through the optical center of the camera 24 and connects the characteristic point $F_A$ to the coordinate system CS1 of the camera 24.

In order to express the point $P_{RLA}$ in the coordinate system $CS5_A$, H1-2, H2-$3_A$, H3$_A$-$4_A$ and H4$_A$-$5_A$ are used.

Similarly, the point $P_{RLB}$ is defined as being the point of intersection between the imaginary plane Ly of variable height y, and an optical ray $R_{FB}$ leaving the camera 24 that passes through the characteristic point $F_B$ observed in the second image. The optical ray $R_{FB}$ passes through the optical center of the camera 24 and connects the characteristic point $F_B$ to the coordinate system CS1 of the camera 24.

In order to express the point $P_{RLB}$ in the coordinate system $CS4_B$, H1-2, H2-$3_B$ and H3$_B$-$4_B$ are used.

During the step 300 of estimating the position of the characteristic points $F_A$, $F_B$, the height $\hat{y}$ is considered to be the value that minimizes a cost function based on an iteration of different values of said height y.

In other words, the height y is considered to be a parameter allowing the height error to be evaluated by virtue of a cost function.

More specifically, the cost function is based on minimizing the difference between a first distance that is delimited between the second anchor point $M_A$ and the intersection point $P_{RLA}$ between the imaginary plane Ly of variable height y and the optical ray $R_{FA}$ of the camera 24 that passes through the characteristic point $F_A$ of the first image, and a second distance that is delimited between the second anchoring point $M_B$ and the intersection point $P_{RLB}$ between the imaginary plane Ly of variable height y and the optical ray $R_{FB}$ of the camera 24 that passes through the characteristic point $F_B$ of the second image.

The cost function used in the estimation step 300 is as follows:

$$co\hat{u}t = |\|P_{RLA} - M_A\| - \|P_{RLB} - M_B\||$$

Advantageously, the computer 22 uses an optimization algorithm to minimize the cost function.

By considering that $P_{RLA}$ is expressed in the coordinate system $CS5_A$ and that $M_A$ is the reference of the coordinate system $CS5_A$, then it is possible to write:

$$\|P_{RLA} - M_A\| = \|P_{RLA}\|$$

By considering that $P_{RLB}$ is expressed in the coordinate system $CS4_B$ and that MB is the reference of the coordinate system $CS4_B$, then it is possible to write:

$$\|P_{RLB} - M_B\| = \|P_{RLB}\|$$

Thus, the cost function becomes:

$$co\hat{u}t = |\|P_{RLA}\| - \|P_{RLB}\||$$

Advantageously, the value of the height y is initialized in the cost function so that the points $P_{RLA}$ and $P_{RLB}$ start in a position remote from the optical center of the camera 24.

The estimation step 300 allows the height to be estimated that minimizes the cost function described above, with this estimated height being denoted "ŷ".

The estimated height ŷ allows the estimated points $F_{R\hat{y}A}$ and $F_{R\hat{y}B}$ to be determined, which points provide an approximate position of the characteristic points $F_A$ and $F_B$ in the space in the first position and the second position of the vehicle 10, respectively, in the coordinate systems $CS5_A$ and $CS4_B$, respectively.

Following the estimation step 300, the method comprises a step 400 of geometrically determining the angle of rotation α2 between the trailer 18 and the towing platform 16, based on the estimated characteristic points $F_{r\hat{y}A}$, $F_{r\hat{y}B}$ in the first position and the second position of the vehicle 10.

The point $F_{r\hat{y}A}$ can be expressed in the coordinate system $CS5_A$ as follows:

$$F_{R\hat{y}A} = \begin{bmatrix} x_{FA} \\ y_{FA} \\ z_{FA} \\ 1 \end{bmatrix}$$

Similarly, the point $F_{r\hat{y}B}$ can be expressed in the coordinate system $CS4_B$ as follows:

$$F_{R\hat{y}B} = \begin{bmatrix} x_{FB} \\ y_{FB} \\ z_{FB} \\ 1 \end{bmatrix}$$

Figure 7:
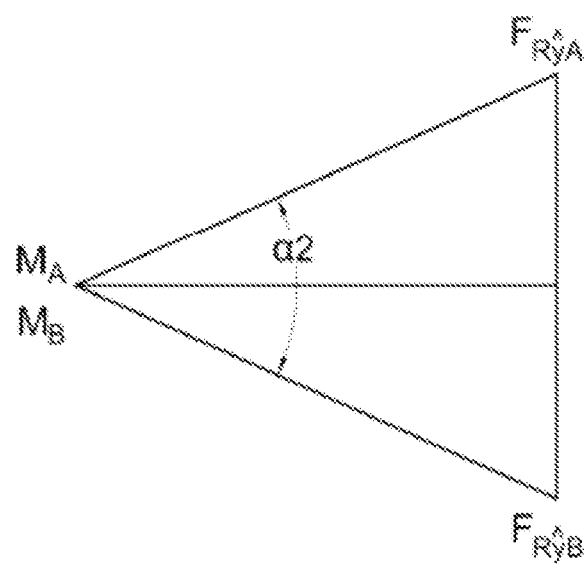
FIG. 7 is a geometric diagram of the estimated position of the characteristic point in the first image and in the second image relative to the second anchoring point.

The estimated characteristic points $F_{r\hat{y}A}$, $F_{r\hat{y}B}$ are shown in FIG. 7, this is obtained by superimposing the centers of the coordinate systems $CS5_A$ and $CS4_B$, by aligning the coordinate systems $CS5_A$ and $CS4_B$, by placing the estimated characteristic points $F_{r\hat{y}A}$, $F_{r\hat{y}B}$ thereon based on their previously computed coordinates, then by projecting the whole along the vertical axis that defines the height of the estimated characteristic points $F_{r\hat{y}A}$, $F_{r\hat{y}B}$.

Thus, FIG. 7 is a projection of the estimated characteristic points $F_{r\hat{y}A}$, $F_{r\hat{y}B}$, and of the second anchoring point $M_A$, $M_B$ viewed from above, where:

$$F_{R\hat{y}A} = (x_{FA}, z_{FA}) \text{ and}$$

$$F_{R\hat{y}B} = (x_{FB}, z_{FB})$$

Based on the estimated characteristic points $F_{r\hat{y}A}$, $F_{r\hat{y}B}$, the angle of rotation α2 between the trailer 18 and the towing platform 16 is computed as follows:

$$\alpha 2 = 2 * \sin^{-1}\left(\frac{|F_{R\hat{y}B} - F_{R\hat{y}A}|/2}{|F_{R\hat{y}A} - M|}\right)$$

$$\alpha 2 = 2 * \sin^{-1}\left(\frac{\sqrt{(x_{FB} - x_{FA})^2 + (z_{FB} - z_{FA})^2}}{2 * \sqrt{x_{FA}^2 + z_{FA}^2}}\right)$$

Thus, an aspect of the present invention offers a solution that allows the angle of rotation α2 between the trailer 18 and the towing platform 16 to be determined by means of a single camera 24.

Determining the angle of rotation α2 between the trailer 18 and the towing platform 16 allows assistance to be provided when reversing a double-articulated trailer vehicle.

In addition, the method and the system for determining the angular position of a vehicle according to an aspect of the invention are based on simple computations that allow rapid execution by a computer.

Finally, the method and the system for determining the angular position of a vehicle according to an aspect of the invention are based on determining the position of a set of characteristic points of the trailer, which allows adaptability to a wide range of vehicle types.

It will be noted that the method according to an aspect of the invention requires certain conditions in order to operate in an optimum manner.

Indeed, if the camera 24 and the characteristic point $F_A$, $F_B$ whose position is to be determined are at the same height in the coordinate system in which the height y is iterated, then the method will have problems determining the position of the characteristic point.

In order to overcome this, the following assumptions must be validated according to the number of degrees of freedom considered between the towing vehicle 14, the towing platform 16 and the trailer 18, at the first anchoring point N and the second anchoring point M.

By considering that the rotation at the first anchoring point N and the rotation at the second anchoring point M only occur about an axis perpendicular to the general plane P of the towing platform 16, on flat ground 12, then a characteristic point simply needs to be followed that is at a different height to the camera 24.

By considering that the rotation at the first anchoring point N occurs on the three degrees of freedom and the rotation at the second anchoring point M only occurs about an axis perpendicular to the general plane P of the towing platform 16, then a characteristic point simply needs to be followed such that the distance between this point and the second anchoring point M is greater than the distance between the camera 24 and the first anchoring point N.

By considering that the rotation at the first anchoring point N and the rotation at the second anchoring point M occur on the three degrees of freedom, then the steps of the method need to be applied to several characteristic points located at different heights and at distances that are relatively far from the second anchoring point M. This configuration will provide an angle for each characteristic point, and, given that the towing vehicle 14 shifts with a unique yaw angle, this angle can be deduced using any parameter estimation method.

The invention claimed is:

1. A method for determining the angular position of a vehicle comprising a towing vehicle, a towing platform articulated on the towing vehicle at a first anchoring point, at least about a first axis of rotation generally perpendicular to the general plane of the towing platform, and a trailer articulated on the towing platform at a second anchoring point, at least about a second axis of rotation generally perpendicular to the general plane of the towing platform, at a second anchoring point, which method is implemented by a system comprising a computer and a camera oriented toward the trailer, the method comprising:
   the camera acquiring a first image in a first reference position of the vehicle, and of detecting at least one characteristic point of the trailer in said first position, which point is observed in the first image;
   the camera acquiring a second image in a second position of the vehicle, and of detecting said characteristic point in the second position, which point is observed in the second image, the detected characteristic point being the same for each position;

estimating the position of the characteristic point in the first position and the second position of the vehicle, which point is observed in the first image and in the second image, respectively, by minimizing a cost function based on an iteration of different values of the height of the characteristic point in the first position of the vehicle and of the characteristic point in the second position of the vehicle, along an axis perpendicular to the general plane of the towing platform; and determining the angle of rotation between the trailer and the towing platform based on the estimated position of the characteristic point in the first position and the second position that is estimated during the previous estimation step.

2. The method as claimed in claim 1, wherein the cost function used in estimating the position of the characteristic point is as follows:

$$coût = |\|P_{RLA} - M_A\| - \|P_{RLB} - M_B\||$$

$P_{RLA}$ being the point that indicates the intersection between an imaginary plane that is parallel to the general plane of the towing platform and is of variable height and an optical ray of the camera that passes through the characteristic point of the first position;

$M_A$ being the second anchoring point in the first position;

$P_{RLB}$ being the point that indicates the intersection between said imaginary plane that is parallel to the general plane of the towing platform and is of variable height and an optical ray of the camera that passes through the characteristic point of the second position; and $M_B$ being the second anchoring point in the second position.

3. The method as claimed in claim 1, wherein geometrically determining the angle of rotation between the trailer and the towing platform is obtained by the following computation:

$$\alpha 2 = 2 * \sin^{-1}\left(\frac{|F_{R\hat{y}B} - F_{R\hat{y}A}|/2}{|F_{R\hat{y}A} - M|}\right)$$

with:

$F_{R\hat{y}B}$ being the estimated characteristic point in the second position;

$F_{R\hat{y}A}$ being the estimated characteristic point in the first position; and M being the second anchoring point.

4. A system for determining the angular position of a vehicle comprising a towing vehicle, a towing platform articulated on the towing vehicle at a first anchoring point, at least about a first axis of rotation generally perpendicular to the general plane of the towing platform, and a trailer articulated on the towing platform at a second anchoring point, at least about a second axis of rotation generally perpendicular to the general plane of the towing platform, at a second anchoring point, said system comprising a computer and a camera oriented toward the trailer, the system configured to implement the method as claimed in claim 1.

5. A computer program product, comprising code instructions for implementing the method as claimed in claim 1.

* * * * *